US012699749B2

(12) United States Patent
Mugunda et al.

(10) Patent No.: US 12,699,749 B2
(45) Date of Patent: Aug. 4, 2026

(54) SYSTEM AND METHOD FOR MANAGING DATA PROCESSING SYSTEMS AND HOSTED DEVICES

(71) Applicant: Dell Products L.P., Round Rock, TX (US)

(72) Inventors: Chandrasekhar Mugunda, Austin, TX (US); Rui An, Austin, TX (US); Akshata Sheshagiri Naik, Leander, TX (US); Ajay Shenoy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 566 days.

(21) Appl. No.: 18/185,559

(22) Filed: Mar. 17, 2023

(65) Prior Publication Data

US 2024/0311442 A1    Sep. 19, 2024

(51) Int. Cl.
*G06F 17/40* (2006.01)
*G06F 9/54* (2006.01)
*G06F 11/34* (2006.01)

(52) U.S. Cl.
CPC .............. *G06F 17/40* (2013.01); *G06F 9/547* (2013.01); *G06F 11/3476* (2013.01)

(58) Field of Classification Search
CPC ....... G06F 17/40; G06F 9/547; G06F 11/3476
See application file for complete search history.

(56) References Cited

U.S. PATENT DOCUMENTS

| | | | | |
|---|---|---|---|---|
| 10,437,754 | B1 * | 10/2019 | Ebisuzaki | ........... G06F 13/1668 |
| 10,489,232 | B1 * | 11/2019 | BeSerra | .............. G06F 11/0709 |
| 10,719,374 | B1 * | 7/2020 | Mathur | ................. G06F 16/252 |
| 11,870,668 | B1 * | 1/2024 | Mugunda | ............ G06F 11/3006 |
| 2006/0253633 | A1 | 11/2006 | Brundridge | |
| 2008/0104453 | A1 | 5/2008 | Mukherjee | |
| 2012/0284211 | A1 | 11/2012 | Datta | |
| 2015/0370294 | A1 | 12/2015 | Busch | |
| 2016/0034331 | A1 | 2/2016 | Na | |
| 2017/0339178 | A1 * | 11/2017 | Mahaffey | ............ G06F 11/3006 |
| 2018/0139262 | A1 * | 5/2018 | Li | ........................... H04L 67/10 |
| 2018/0307579 | A1 * | 10/2018 | Rothchilds | ......... G06F 11/3065 |
| 2019/0017513 | A1 | 1/2019 | Hillerup | |
| 2019/0108116 | A1 * | 4/2019 | Benes | ................. G06F 11/3696 |
| 2020/0021885 | A1 * | 1/2020 | Li | ........................... H04L 43/08 |
| 2020/0201650 | A1 | 6/2020 | Huang | |
| 2023/0156032 | A1 * | 5/2023 | Andriani | ............. H04L 63/1433 726/22 |
| 2023/0359517 | A1 | 11/2023 | Senn | |

OTHER PUBLICATIONS

Plesky (REST—All You Have To Know About Representational State Transfer, plesk.com/blog, blog, Apr. 13, 2020) (Year: 2020).*
Bigelow (What is edge computing? Everything you need to know, TechTarget, Search Data Center, Dec. 8, 2021 (Year: 2021).*

* cited by examiner

*Primary Examiner* — Christian T Bryant
(74) *Attorney, Agent, or Firm* — WOMBLE BOND DICKINSON (US) LLP

(57) ABSTRACT

Methods and systems for managing operation of data processing systems are disclosed. To manage operation of the data processing systems, the data processing systems may present unified communication and management systems. The unified communication and management systems may be used to manage the operation of any number of devices hosted by the data processing systems. The unified communication and management systems may be implemented using representational state transfer interface.

20 Claims, 9 Drawing Sheets

SYSTEM AND METHOD FOR MANAGING DATA PROCESSING SYSTEMS AND HOSTED DEVICES

FIELD

Embodiments disclosed herein relate generally to device management. More particularly, embodiments disclosed herein relate to systems and methods to manage the operation of data processing systems in a distributed system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
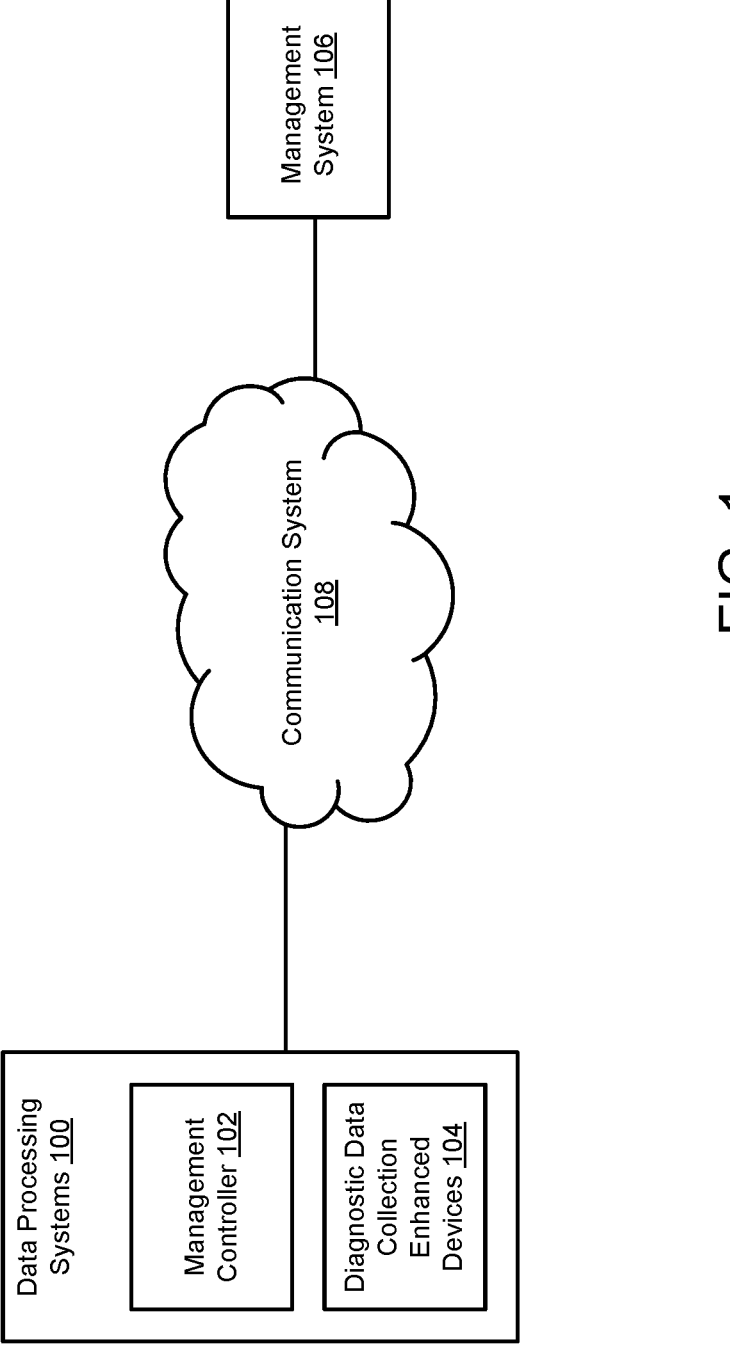
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. To manage the operation of data processing systems, a management system may obtain information regarding their operation and update their operation based on the obtained information.

The data processing systems, and some devices hosted by the data processing systems, may be implemented using diagnostic data collection enhanced devices (DDCEDs). A DDCED may be a device that is able to present itself to the management system in a distributed environment and participate in its management. To do so, the DDCED may implement network end points to which communications from the management system may be directed, interfaces through which functionalities of the DDEC may be invoked, etc.

However, as the number of DDCEDs hosted by a data processing system grows over time, it may become progressively more difficult to manage the individual DDCEDs and incur additional management overhead. Additionally, the functionalities invokable may be limited to only those presented by the DDCEDs.

To manage the overhead, reduce complexity for managing data processing systems, and/or to provide additional capabilities to invoke functionalities of DDCEDs, the data processing systems may present a unified communication and management system through which DDCEDs hosted by the data processing system may be managed.

The unified communication and management system may do so by presenting an unified interface through which functionalities of any number of devices may be invoked. When a request for a function is received, the request may be forwarded to a guest management controller if it may be natively serviced. If the request may not be natively serviced, then a management controller that received the request may service the request. Once service, a corresponding response may be provided to the requesting entity.

By doing so, any number of DDCEDs may be managed by a management system using a unified communication and management system. Thus, embodiments disclosed herein may address, among others, the technical challenges of limited computing resources for management and limited functionalities of devices that may attempt to service requests. By consolidating management responsibility into a unified communication and management system, a management system may more efficiently analyze the condition of the data processing system and hosted DDCEDs.

In an embodiment, a method for managing diagnostic data collection enhanced devices (DDCEDs) hosted by a data processing system is disclosed. The method may include obtaining, by a management controller of the data processing system, a request for diagnostic data for a DDCED of the DDCEDs; making a determination, by the management controller, regarding whether the DDCED presents an interface for retrieval of the diagnostic data; in a first instance of the determination where the DDCED presents the interface: bridging, by the management controller, the request to a guest management controller of the DDCED; obtaining, by the management controller, a response to the request from the guest management controller; and providing, by the management controller, the response to a requesting entity to service the request for the diagnostic data.

The method may also include, in a second instance of the determination where the DDCED does not present the interface: sending, by the management controller, a synthesized data request based on the request for the diagnostic data to a logic device of the DDCED; obtaining, by the management controller, data that is responsive to the synthesized data request from the guest management controller; obtaining, by the management controller, a synthetic response using the data; and providing, by the management controller, the synthetic response to the requesting entity to service the request for the diagnostic data.

The guest management controller may be operably connected to the logic device, and the logic device may be operably connected to components of the DDCED for which the request for the diagnostic data is directed.

The interface may be a universal resource identifier of a Representational State Transfer (REST) interface presented by the guest management controller.

The REST interface may present a portion of all available telemetry data available for the components, and may not present a second portion of the all available telemetry data available for the components.

The method may also include, prior to obtaining the request: identifying presence of the DDCED; enumerating universal resource identifiers presented by the REST interface; and establishing a bridging interface for the DDCED based on the universal resource identifiers.

Bridging the request may include making a second determination that the request specifies one of the universal resource identifiers; and based on the second determination, forwarding the request to the guest management controller.

In an embodiment, a non-transitory media is provided. The non-transitory media may include instructions that when executed by a processor cause the computer-implemented method to be performed.

In an embodiment, a data processing system is provided. The data processing system (or a management controller hosted by the data processing system) may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer-implemented services, the system may include any number of data processing systems 100. Data processing systems 100 may provide the computer implemented services to users of data processing systems 100 and/or to other devices (not shown), and/or may cooperate with other devices that provide the computer implemented services. Different data processing systems may provide similar and/or different computer implemented services.

For example, any of data processing systems 100 may be members of cloud environments that provide the computer implemented services. The cloud environments may include any number of devices that provide computer implemented services.

To provide the computer-implemented services, data processing systems 100 may include various hardware components (e.g., processors, memory modules, storage devices, etc.) and host various software components (e.g., operating systems, application, startup managers such as basic input-output systems, etc.). These hardware and software components may provide the computer-implemented services via their operation.

To provide certain computer-implemented services, the hardware and/or software components may need to operate in predetermined manners. If the hardware and/or software components do not operate in the predetermined manners, then a data processing system may be unable to provide all, or a portion, of the computer-implemented services that it normally provides.

In general, embodiments disclosed herein may provide methods, systems, and/or devices for managing the operation of data processing systems 100. To manage the operation of data processing system 100, management system 106 may (i) collect information regarding the operation of a data processing system, and/or components thereof, and (ii) modify the operation of data processing system 100, and/or components hereof. By doing so, management system 106 may manage the operation of any number of data processing systems 100. Accordingly, the data processing systems may be more likely to successfully provide desired computer implemented services over time.

To collect information and modify the operation of the data processing system, management system 106 may communicate with data processing systems 100. However, due to the proliferation of devices with self-report and/or self-management capabilities, any of data processing systems 100 may include any number of diagnostic data collection enhanced devices (DDCEDs) 104.

Figure 2A:
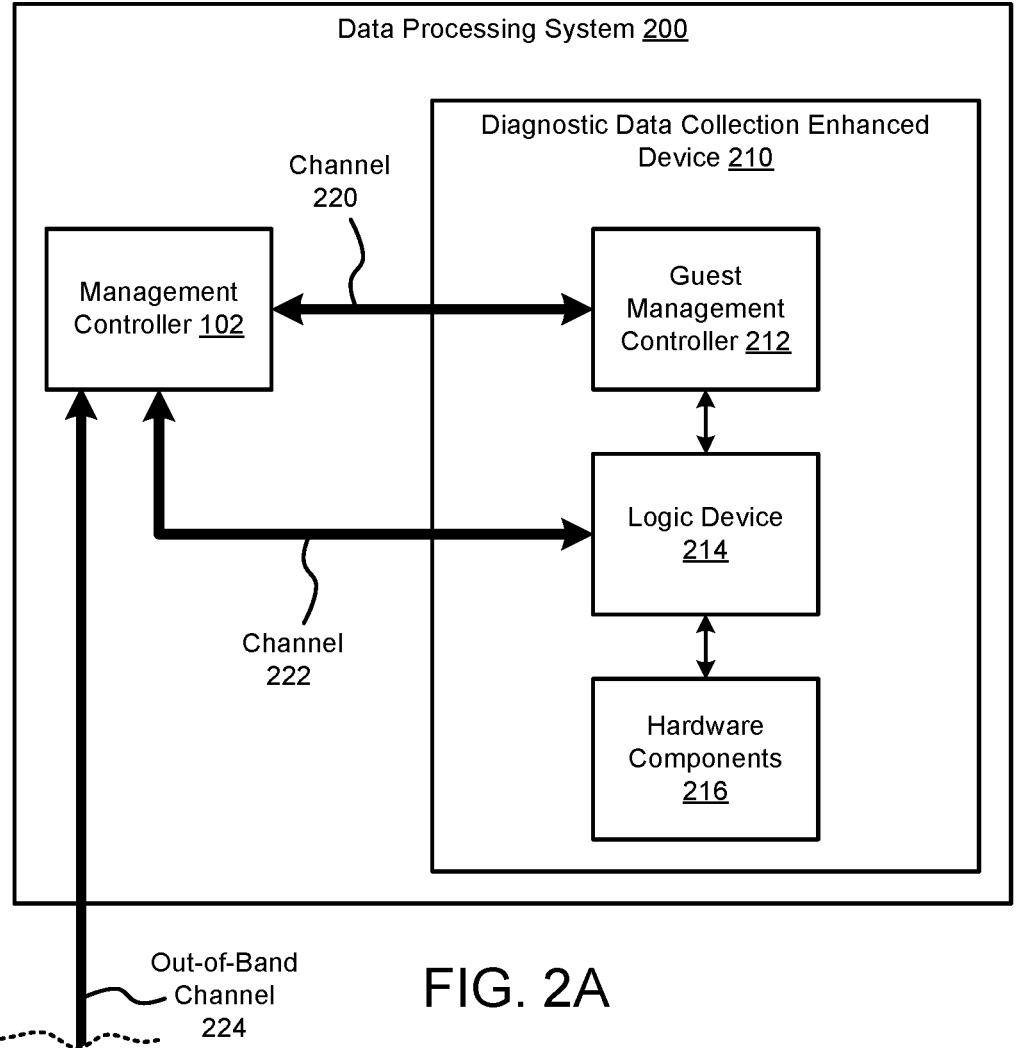
FIGS. 2A-2E show diagrams illustrating data flows in accordance with an embodiment.

A DDCEDs may be a hardware device that may present itself (or some of its functionality) to management systems for management purposes. For example, a DDCEDs may include an embedded computing system (e.g., a guest management controller) that manages the operation of components of the DDCEDs, presents functionality of the DDCEDs to other entities, and/or performs other management functionalities. The DDCEDs may be, for example, a graphics processing unit or complex, a smart network interface card or complex, a data processing unit or complex, or any other types of devices that may include management capabilities. Such DDCEDs may include multiple components that may include various capabilities. Refer to FIG. 2A for additional details regarding components of DDCEDs.

The functionalities of DDCEDs 104 may be presented to other devices by, for example, presenting the DDCEDs to external systems (e.g., via in-band or out-of-band communications) as a separately manageable device from a host data processing system.

However, if DDCEDs 104 present themselves as being separate from a host data processing system, management of the data processing system and DDCEDs 104 may be more difficult. For example, management system 106 may need to understand that the DDCEDs are hosted by a corresponding data processing system, and manage them accordingly.

Additionally, if DDCEDs 104 present themselves as being separate from a host data processing system, then the functionalities available to other entities such as management system 106 may be limited to only those natively presented by DDCEDs 104. For example, if DDCEDs 104 present an interface (e.g., a representational state transfer (REST) interface with addressable universal resource identifiers) that only allows access to some telemetry data produced by the components of DDCEDs 104, then entities that utilize only the native functionalities of DDCEDs 104 may be unable to retrieve other types of telemetry data that is produced by the components of DDCEDs.

To reduce the complexity of managing data processing system and DDCEDs 104, a data processing system in accordance with an embodiment may implement a single management communication model for all hosted DDCEDs.

To implement the management communication model, each of data processing systems 100 may host an instance of management controller 102. Management controller 102 may (i) manage communications between DDCEDs 104, a host data processing system, and management system 106, (ii) monitor the operation of the hosted DDCEDs, (iii) provide information regarding the operation of DDCEDs 104 to management system 106, (v) obtain management operations from management system 106 that are responsive to the information, and (iv) initiate performance of the management operations.

To monitor operation of DDCEDs 104, management controller 102 may (i) establish a bridging interface for interfaces presented by DDCEDs 104 to allow for direct remote monitoring of some of the operation of DDCEDs 104, and (ii) provide for remote monitoring of other operation of the DDCEDs 104 through collection of operation data from DDCEDs 104. When requests for data (e.g., diagnostic data) from a DDCED is received, management controller 102 may first ascertain whether the request may be serviced by native interfaces presented by the DDCED. If the request can be natively serviced, then the request may be bridged to a guest management controller of the DDCED. If the request cannot be natively serviced, then management controller 102 may use other logic devices of the DDCEDs to collect operation data, generate a synthetic response based on the collected data, and provide the synthetic response to service the request.

Management system 106 may manage data processing systems 100 (e.g., the processing complexes of the data processing systems), and DDCEDs 104. To do so, management system 106 may obtain information regarding operation of DDCEDs 104 from management controller 102 to select management operations to be performed to manage operation of the data processing systems, and components thereof. When doing so, management system 106 may utilize the unified interface presented by management controller 102. Consequently, management system 106 may not need to take into account limits on the native functionality of DDCEDs 104. Rather, the unified interface provided by management controller 102 may allow for both native functionality of DDCEDs 104 to be invoked, as well as supplemental functionality orchestrated by management controller 102.

For example, the unified interface presented by management controller 102 may indicate that both (i) diagnostic data available using native functionality of DDCEDs 104 and (ii) other diagnostic data that is not natively available using the native functionality of DDCEDs 104 is available. Consequently, when requests for diagnostic data are received by management controller 102, management controller 102 may parse the request and either pass through the request to DDCEDs 104 or service the request by invoke functionality of DDCEDs 104 that is not presented by the native interfaces of DDCEDs 104.

Figure 3A:
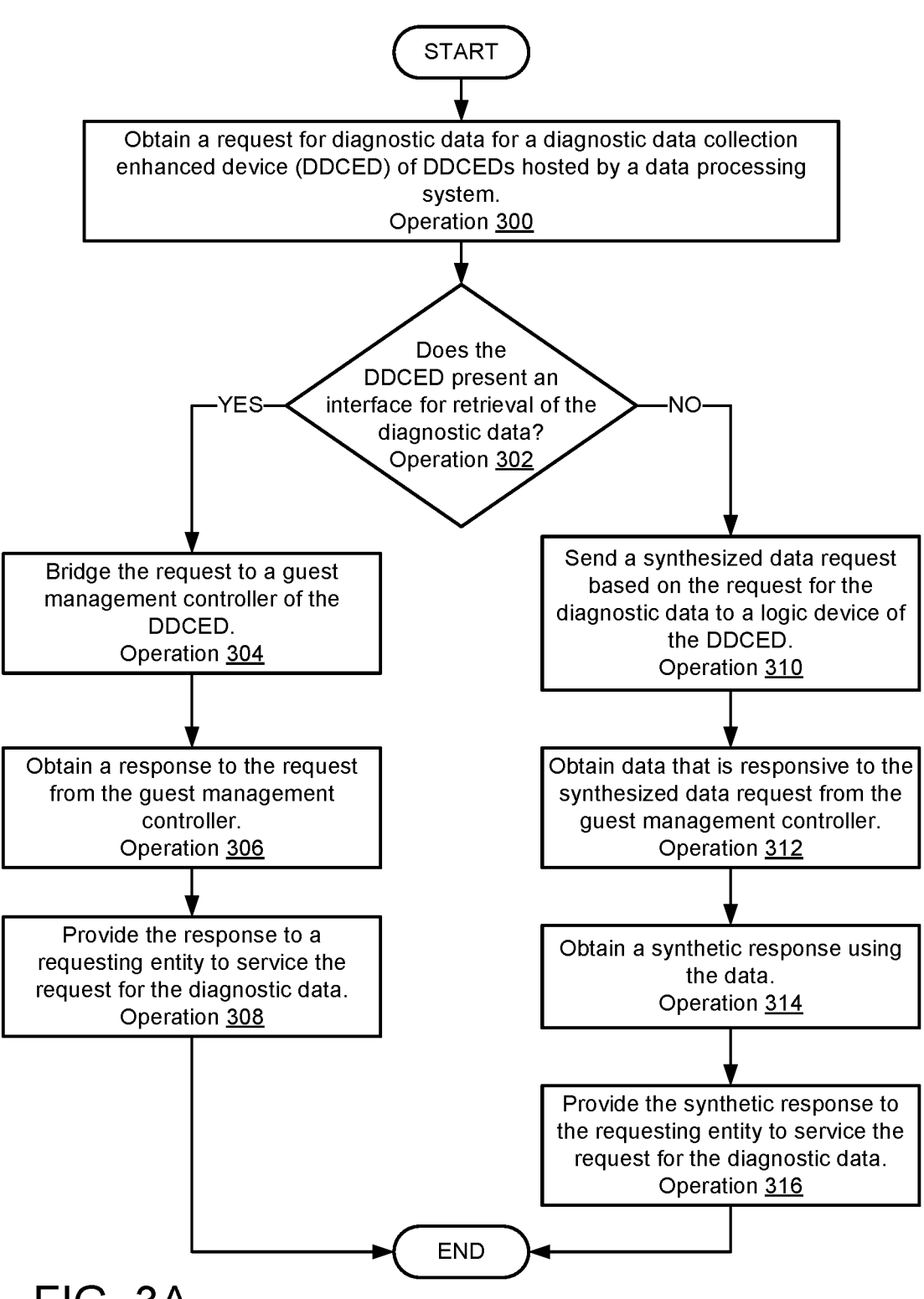
FIGS. 3A-3B show flow diagrams illustrating methods of managing operation of data processing systems in accordance with an embodiment.
Figure 3B:
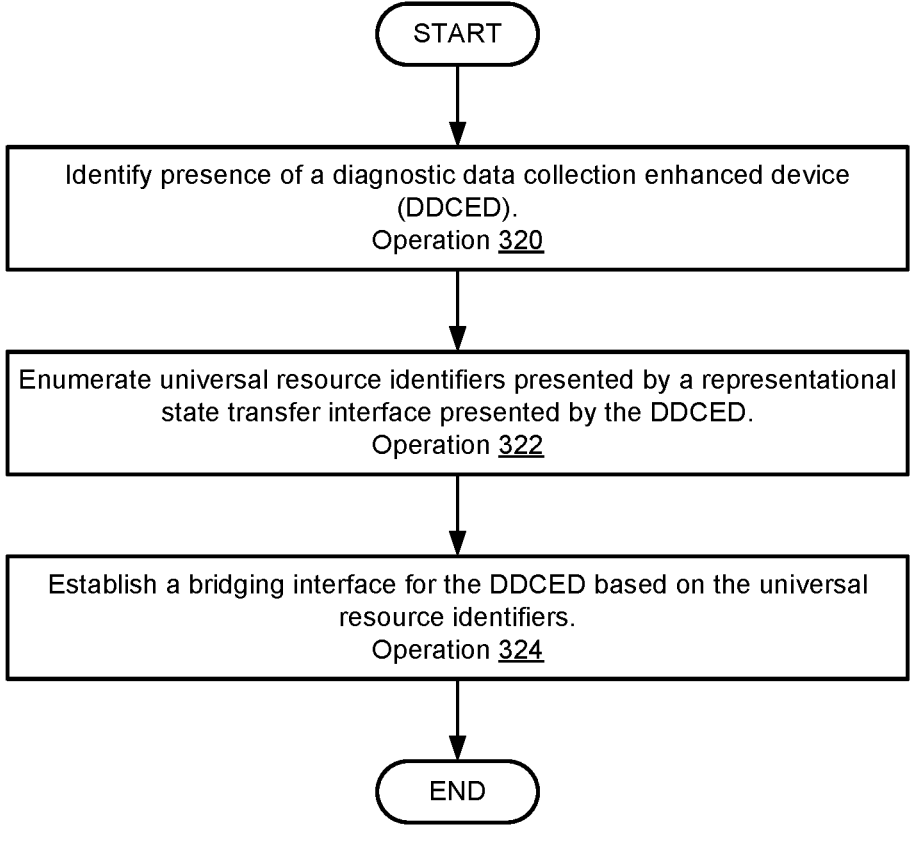

When providing their functionality, any of data processing system 100s and management system 106 may perform all, or a portion, of the methods illustrated in FIGS. 3A-3B.

Any of data processing systems 100 and/or management system 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Management system 106 may be implemented with multiple computing devices. The computing devices of management system 106 may cooperatively perform processes for managing the operation of data processing systems 100. The computing devices of management system 106 may perform similar and/or different functions.

Any of the components illustrated in FIG. 1 may be operably connected to each other (and/or components not illustrated) with communication system 108. In an embodiment, communication system 108 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, a diagram illustrating components of a data processing system in accordance with an embodiment is shown in FIG. 2A, and diagrams illustrating data flows implemented by and data structures used by a system over time in accordance with an embodiment are shown in FIGS. 2B-2E.

Turning to FIG. 2A, a diagram of data processing system 200 in accordance with an embodiment is shown. Data processing system 200 may be similar to any of data processing systems 100.

Data processing system 200 may include management controller 102 and DDCED 210. DDCED 210 may be similar to any of DDCEDs 104. While illustrated as including one DDCED, data processing system 200 may include any number of DDCEDs without departing from embodiments disclosed herein.

DDCED 210 may include hardware components 216 that perform various functions. The hardware components may include graphics processing units, data processing units, and/or types of components that may provide functionalities usable to provide computer implemented services.

DDCED 210 may also include logic device 214. Logic device 214 may manage communications between hardware components 216, may provide management functionality for hardware components 216, and/or may perform other functions. The management functions may include, for example, collecting information regarding the operation of hardware components 216. DDCED 210 may be implemented using, for example, a field programmable gate array, application specific integrated circuit, or other type of digital data processing and/or communication component.

DDCED 210 may further include guest management controller 212. As discussed with respect to FIG. 1, guest management controller 212 may facilitate use of various functionalities of DDCED 210. For example, guest management controller 212 may present a representational state transfer interface through which some functionalities of DDCED 210 may be invoked. The representational state transfer interface may be present various universal resource identifiers which may be used to invoke different functionalities of DDCED 210.

Guest management controller 212 and logic device 214 may be operably connected to management controller 102 via channel 220 and channel 222. Channel 220 may be implemented using, for example, a universal serial bus compliant communication channel. Channel 222 may be implemented using a data bus such as a I2C communication link.

Management controller 102 may also be operably con-
nected to management system 106 via out-of-band channel
224. Out-of-band channel 224 may be implemented using an
out of band management channel.

Management controller 102 may present the unified inter-
face to management system 106 using out-of-band channel
224, and the management system may invoke various func-
tionalities presented by the unified interface using the chan-
nel. When invoked, management controller 102 may dis-
criminate functionalities natively performable by guest
management controller 212, and may forward request for
those functionalities to guest management controller 212 for
performance via channel 220.

Requests for functionalities that are not natively perform-
able by guest management controller 212 may be process by
management controller 102. To do so, management control-
ler 102 may request information from logic device 214 via
channel 222.

The unified interface may also be implemented using a
representational state transfer interface. The representation
state transfer interface may include universal resource iden-
tifier corresponding to native functionality of guest manage-
ment controller 212, and other functionalities provided by
management controller 102. Thus, management system 106
may invoke the respective functionalities using the corre-
sponding universal resource identifiers. Refer to FIGS.
2B-2E for additional details regarding servicing requests
from management system 106.

Figure 2B:
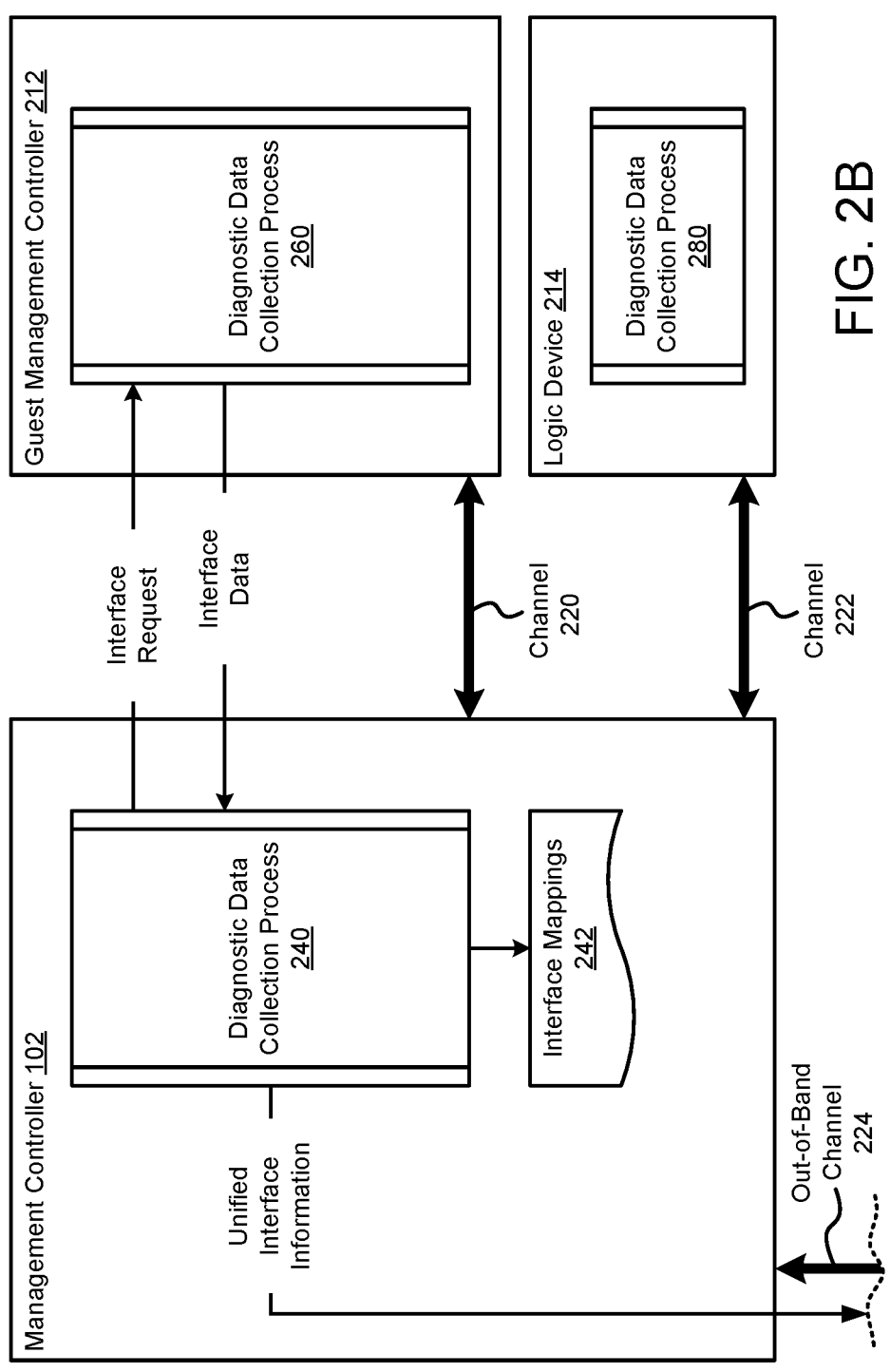

Turning to FIG. 2B, a first data flow diagram illustrating
data flows, data processing, and/or other operations that may
be performed by the system of FIG. 1 in accordance with an
embodiment is shown.

As seen in FIG. 2B, management controller 102 may host
diagnostic data collection process 240 through which
requests for diagnostic data may be processed. To obtain
such requests, an interface request may be sent to guest
management controller 212. The interface request may be
for information regarding an interface for functionality of
guest management controller 212 that may be invoked using
a representational state transfer interface. Diagnostic data
collection process 260 (or other types of management pro-
cesses) may process the request and provide interface data in
response to the request. The interface data may include
information regarding the functionalities that may be
invoked, and corresponding universal resource identifiers
for the respective functionalities.

Diagnostic data collection process 240 may use the inter-
face data to establish interface mappings 242. Interface
mappings 242 may specify universal resource identifiers
associated with functionalities of guest management con-
troller 212. When requests with these universal resource
identifiers are received, the requests may be forwarded to
guest management controller 212 for servicing.

Additionally, the interface data may be used to update the
unified interface presented by management controller 102 to
present functionality of guest management controller 212
that may be invoked by other entities. Unified interface
information reflecting the changes to the unified interface
may be provided to the other entities so that the other entities
(e.g., management system 106) are aware of the function-
alities that may be invoked.

Figure 2C:
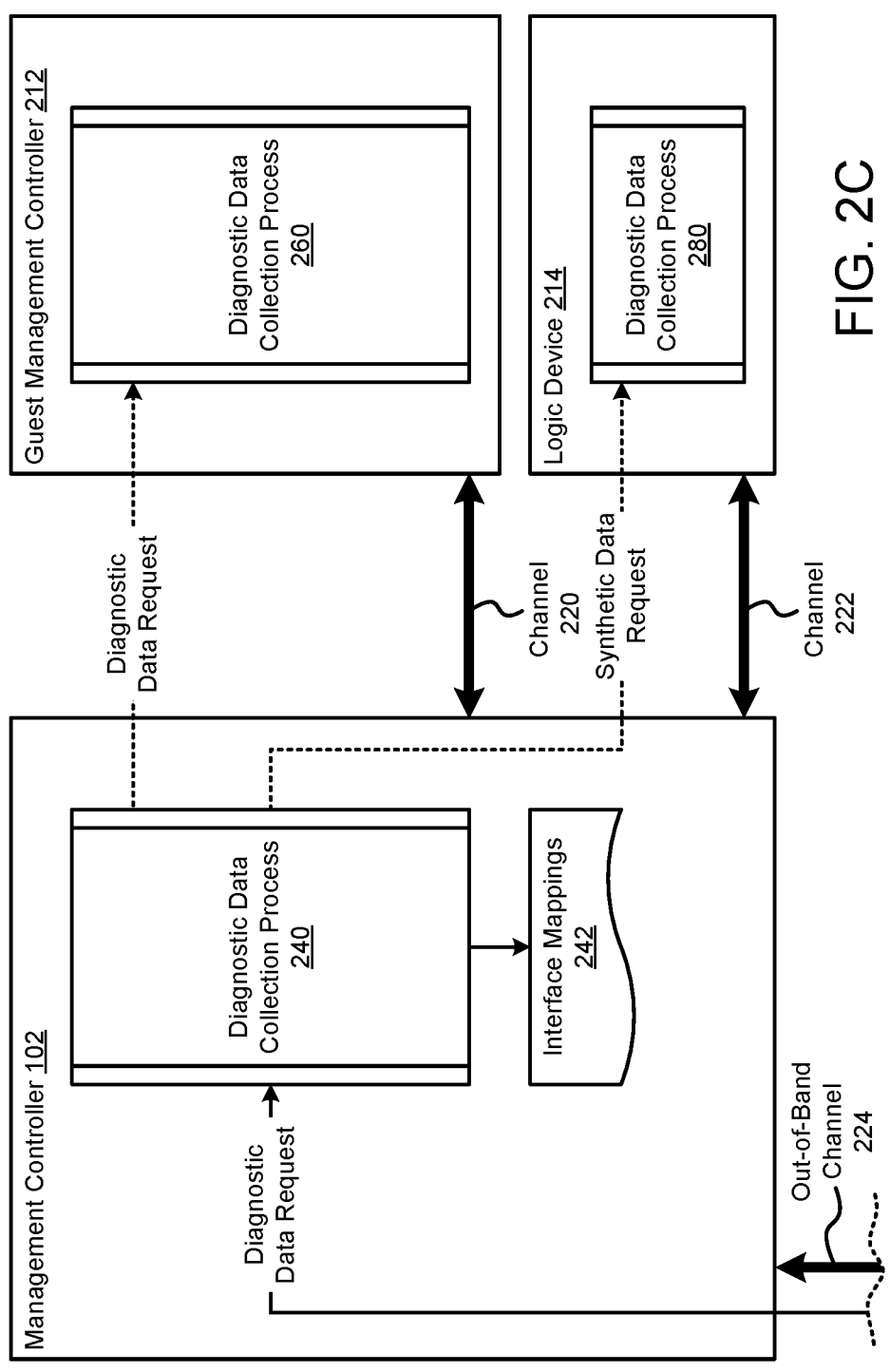

Turning to FIG. 2C, a second data flow diagram illustrat-
ing data flows, data processing, and/or other operations that
may be performed by the system of FIG. 1 in accordance
with an embodiment is shown.

Using the unified interface, management system 106 may
send a diagnostic data request to management controller

8

102. The diagnostic data request may indicate a universal
resource identifier which may be associated with function-
ality of guest management controller 212, or other function-
ality.

A lookup or other process may be performed using
interface mappings 242. The lookup may indicate whether
the universal resource identifier is associated with guest
management controller 212.

If the universal resource identifier is associated with guest
management controller 212, then diagnostic data request
may be bridged to guest management controller 212 for
processing. In contrast, if the universal resource identifier is
not associated with the guest management controller, then
functionality of management controller 102 may be invoked.
The functionality may include generating and providing a
synthetic data request to logic device 214 of the DDCES that
hosts guest management controller 212. The synthetic data
request may be a request for data in a format that is
understandable by diagnostic data collection process 280
hosted by logic device 214. In FIG. 2C, the lines indicating
that the diagnostic request or synthetic data request are
provided to guest management controller 212 and logic
device 214, respectively, are drawn in dashing to indicate
that their may occur depending on whether the universal
resource identifier of diagnostic data request is or is not
associated with functionality of guest management control-
ler 212.

Figure 2D:
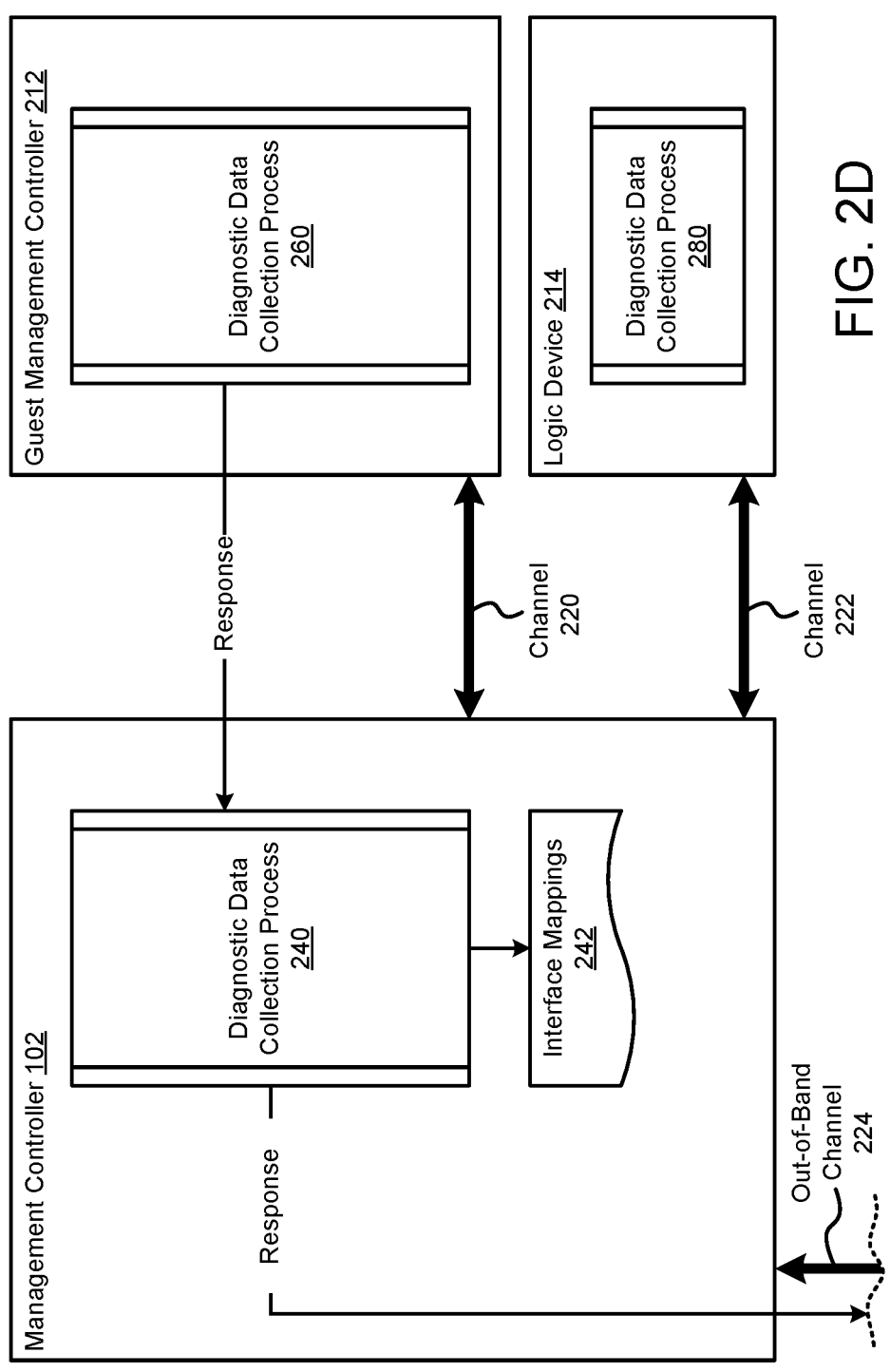

Turning to FIG. 2D, a third data flow diagram illustrating
data flows, data processing, and/or other operations that may
be performed by the system of FIG. 1 in accordance with an
embodiment is shown.

Continuing with the discussion from FIG. 2C, if the
request is bridged to guest management controller 212,
diagnostic data collection process 260 may generate a
response and provide the response to management controller
102. To generate the response, while not shown, diagnostic
data collection process 260 may send requests to logic
device 214 for various portions of information regarding the
operation of components of the DDCED, and generate the
response using the information. Management controller 102
may provide the response and/or information based on the
response to the requesting entity (e.g. a management sys-
tem).

Figure 2E:
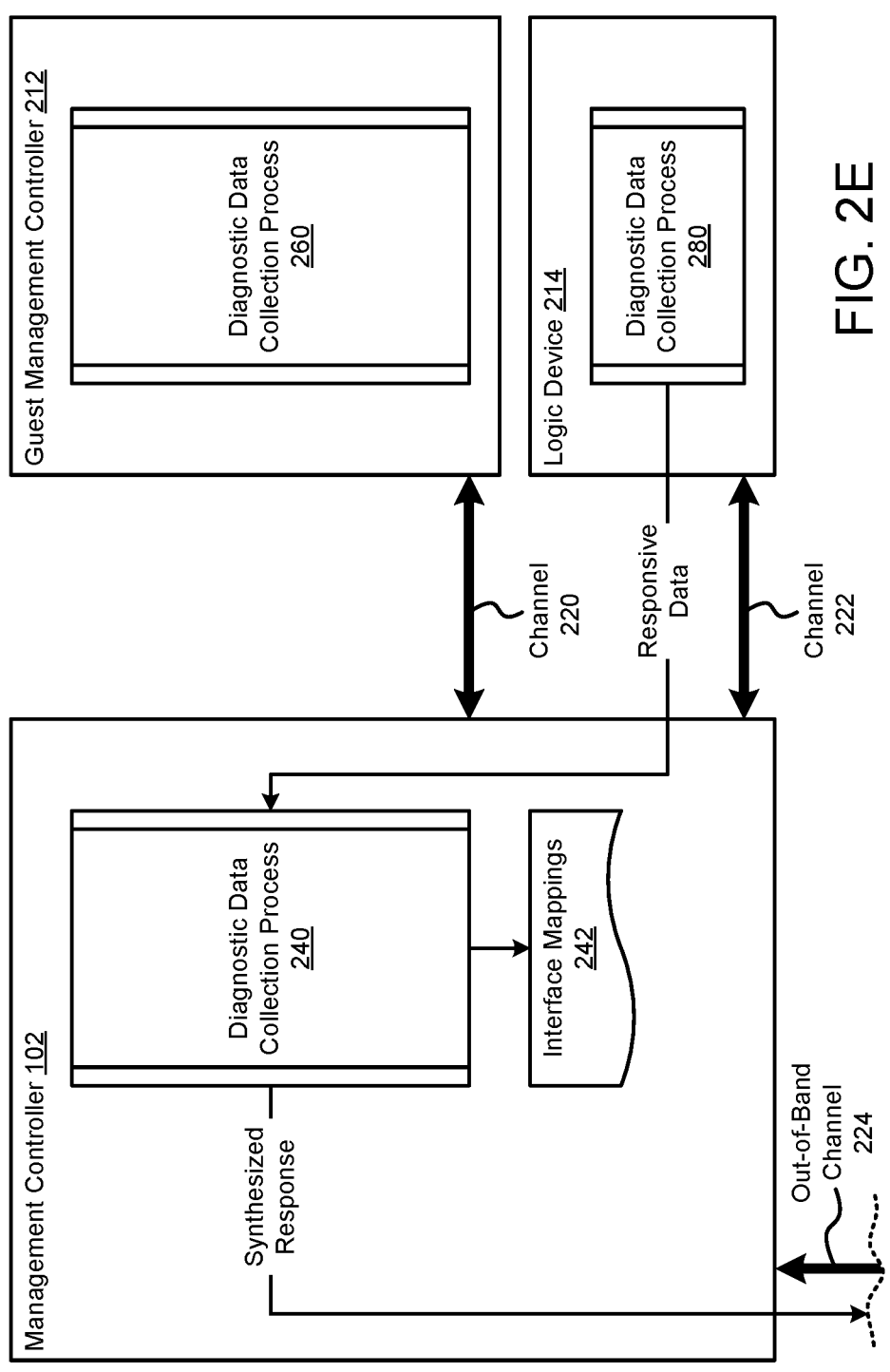

Turning to FIG. 2E, a fourth data flow diagram illustrating
data flows, data processing, and/or other operations that may
be performed by the system of FIG. 1 in accordance with an
embodiment is shown.

Continuing with the discussion from FIG. 2D, if a syn-
thetic data request is generated and sent to logic device 214,
diagnostic data collection process 280 may provide respon-
sive data based on the synthetic data request to management
controller 102. The responsive data may be in an undesired
format, may not be aggregated, and/or otherwise may
diverge from expectations of management system 106.

To meet the expectations of management system 106,
management controller 102 may generated a synthesized
response using the responsive data. The synthesized
response may comply with expectations of management
system 106. Consequently, when synthesized response is
provided to management system 106, the synthesized
response may be consistent with other responses from the
unified interface that may be serviced by guest management
controller 212.

Thus, as shown in FIGS. 2B-2E, a data processing system
in accordance with an embodiment may present a unified
interface through which the data processing system and
hosted DDCEDs may be communicated with and managed.

In an embodiment, any of management controller 102, guest management controller 212, and/or logic device 214 are implemented using a hardware device including circuitry. The hardware device may be, for example, a digital signal processor, a field programmable gate array, or an application specific integrated circuit. The circuitry may be adapted to cause the hardware device to perform the functionality of management controller 102, guest management controller 212, and/or logic device 214 as discussed herein. Management controller 102, guest management controller 212, and/or logic device 214 may be implemented using other types of hardware devices without departing embodiment disclosed herein.

In an embodiment, any of management controller 102, guest management controller 212, and/or logic device 214 are implemented using a processor adapted to execute computing code stored on a persistent storage that when executed by the processor performs the functionality of management controller 102, guest management controller 212, and/or logic device 214 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, any of management controller 102, guest management controller 212, and/or logic device 214 include storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures discussed herein. Any of these data structures may be implemented using, for example, lists, tables databases, linked lists, unstructured data, and/or other types of data structures.

As discussed above, the components of FIG. 1 may perform various methods to manage operation of data processing systems. FIGS. 3A-3B illustrate methods that may be performed by the components of the system of FIG. 1. In the diagram discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing data processing systems in accordance with an embodiment is shown. The method may be performed by any of data processing systems 100, management controller 102, management system 106, and/or other components of the system shown in FIG. 1.

At operation 300, a request for diagnostic data for a DDCED of DDCEDs hosted by a data processing system is obtained. The request may be obtained by receiving it from another entity. The request may be obtained via a representational state transfer interface presented by a management controller to the other entity. The request may specify a universal resource identifier as an indication of a function to be invoked.

At operation 302, a determination is made regarding whether the DDCED presents an interface for retrieval of the diagnostic data. The determination may be made by performing a lookup or other process with respect to the universal resource identifier. The lookup may return an indication of whether the DDCED presents the interface. For example, the lookup may be performed in a data structure that associates universal resource identifiers with entities that provide functionalities associated with the universal resource identifiers.

If the DDCED does not present the interface for retrieval of the diagnostic data, then the method may proceed to operation 310. Otherwise, the method may proceed to operation 304.

At operation 304, the request is bridged to a guest management controller of the DDCED. The request may be bridged by forwarding it or information regarding the request to the guest management controller via a channel between the management controller and the guest management controller.

Once bridged, the guest management controller may process the request by, for example, invoking functionality of a logic device to obtain information regarding operation of the DDCED, and generate a response based on the obtained information.

At operation 306, a response to the request is obtained from the guest management controller, the response may be obtained by receiving it from the guest management controller via a communication over the channel through which the request was bridged to the guest management controller.

At operation 308, the response is provided to a requesting entity to service the request for the diagnostic data. The response may be provided to the request entity by sending it in a communication to the requesting entity.

The method may end following operation 308.

Returning to operation 302, the method may proceed to operation 310 when the DDCED does not present the interface for retrieval of the diagnostic data.

At operation 310, a synthesized data request based on the request for the diagnostic data is sent to a logic device of the DDCED. The synthesized data request may be sent by encapsulating it in a communication and sending the communication to the logic device via a channel between the management controller and the logic device of the DDCED.

Once received, the logic may process the synthesized data request by, for example, obtaining information regarding operation of the DDCED, and generating response data based on the obtained information.

At operation 312, data that is responsive to the synthesized data request is obtained from the guest management controller. The data may be obtained by receiving it via communication with the guest management controller.

At operation 314, a synthetic response is obtained using the data. The synthetic response may be obtained by populating a template communication, or other data structure, using the data. The populated data structure may comply with expectations of the requesting entity, and/or standards for a unified interface provided by the management controller.

At operation 316, the synthetic response is provided to the requesting entity to service the request for the diagnostic data. The synthetic response may be provided to the request entity by sending it in a communication to the requesting entity.

The method may end following operation 316.

To make the determination in operation 302, functionality of the guest management controller and corresponding methods for invoking the functionality may be analyzed to establish a lookup data structure used to implement a bridging interface.

Turning to FIG. 3B, a flow diagram illustrating a method of establishing a bridging interface in accordance with an embodiment is shown. The method may be performed by any of data processing systems 100, management controller 102, management system 106, and/or other components of the system shown in FIG. 1.

At operation 320, presence of a DDCED in a data processing system is identified. The presence may be identified by a management controller of the data processing system. The presence may be identified by (i) performing a discovery process for devices hosted by the data processing system, (ii) by receiving information regarding the presence from the DDCED from the host data processing system, (iii) by reading information regarding the presence from the host data processing system from storage (e.g., such as a data structure which includes information regarding devices hosted by the data processing system), and/or via other methods.

The discovery process may include, for example, attempting to communicate with other devices hosted by the data processing system via one or more communication channels (e.g., such as a data bus through which devices of the data processing system may communicate with one another, and/or via specialized management communication channels such as out of band channels).

At operation 322, universal resource identifiers presented by a representational state transfer interface presented by the DDCED are enumerated. The universal resource identifiers may be enumerated by walking through the universal resource identifiers used by the interface presented by the DDCED.

At operation 324, a bridging interface for the DDCED is established based on the universal resource identifiers. The bridging interface may be established by instantiating a lookup data structure using the universal resource identifiers. For example, the lookup data structure may include entries for the universal resource identifiers that are associated with the guest management controller. The lookup data structure may also include other entries that are not associated with the guest management controller. For example, the other entries may be associated with the management controller thereby indicating that requests with such universal resource identifiers are to be proceed by the management controller rather than the guest management controller.

The method may end following operation 324.

Figure 4:
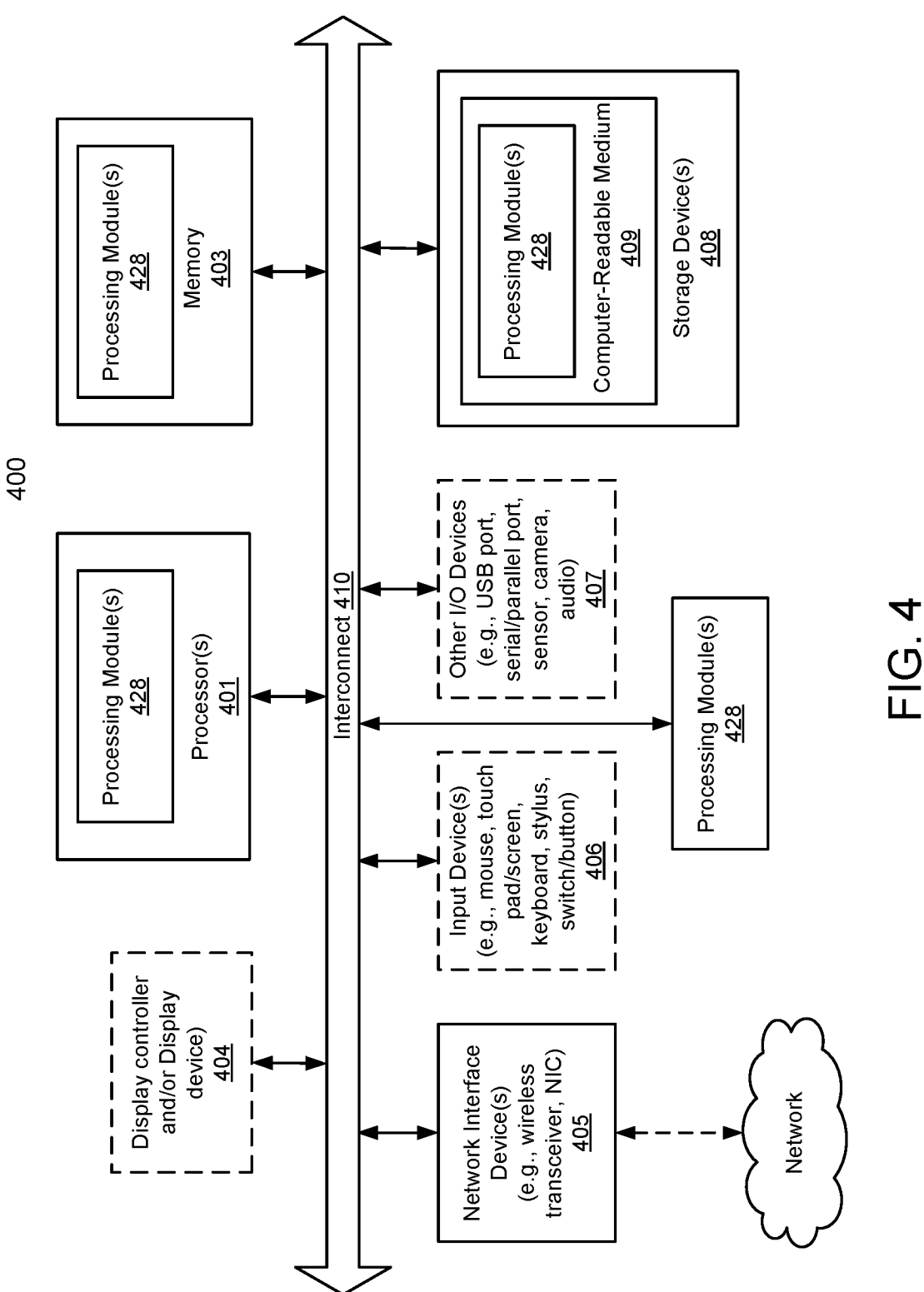
FIG. 4 shows a block diagram illustrating a data processing system in accordance with an embodiment.

Any of the components illustrated in FIGS. 1-2E may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac Os®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing diagnostic data collection enhanced devices (DDCEDs) hosted by a data processing system, the method comprising:

obtaining, by a management controller of the data processing system and from a requesting entity that manages operations of the data processing system and the DDCEDs, a request for diagnostic data for a DDCED of the DDCEDs, wherein the management controller is physically installed internally within the data processing system and is distinct and separate from a first hardware processor of the data processing system, all of the DDCEDs are distinct and separate from both the management controller and the first hardware processor and are also physically installed internally within the data processing system, and the management controller is configured as a unified interface for communications between the requesting entity and the DDCEDs such that all of the communications from the requesting entity that are meant for the DDCEDs are first received by the management controller;

making a determination, by the management controller, regarding whether the DDCED presents an interface for retrieval of the diagnostic data;

in a first instance of the determination where the DDCED presents the interface:

bridging, by the management controller, the request to a guest management controller of the DDCED, the DDCED further comprises a logic device separate from the guest management controller, the logic device manages hardware components of the DDCED for which the request for the diagnostic data is directed and comprises a second hardware processor separate from a third hardware processor of the guest management controller, the hardware components of the DDCED being separate from both the guest management controller and the logic device and comprise a fourth hardware processor separate from the second hardware processor and the third hardware processor, and the management controller of the data processing system is connected to the guest management controller using a first channel and is connected to the logic device using a second channel separate and different from the first channel;

obtaining, by the management controller, a response to the request from the guest management controller; and providing, by the management controller, the response to the requesting entity to service the request for the diagnostic data, the requesting entity being implemented as a computing device remote to the data processing system.

2. The method of claim 1, further comprising:

in a second instance of the determination where the DDCED does not present the interface:

sending, by the management controller, a synthesized data request based on the request for the diagnostic data to the logic device of the DDCED;

obtaining, by the management controller, data that is responsive to the synthesized data request from the guest management controller;

obtaining, by the management controller, a synthetic response using the data; and providing, by the management controller, the synthetic response to the requesting entity to service the request for the diagnostic data.

3. The method of claim 2, wherein the guest management controller is operably connected to the logic device, and the logic device is operably connected to the hardware components of the DDCED.

4. The method of claim 3, wherein the interface is a universal resource identifier of a Representational State Transfer (REST) interface presented by the guest management controller.

5. The method of claim 4, wherein the REST interface presents a portion of all available telemetry data available for the hardware components, and does not present a second portion of the all available telemetry data available for the hardware components.

6. The method of claim 5, further comprising:

prior to obtaining the request:

identifying presence of the DDCED;

enumerating universal resource identifiers presented by the REST interface; and establishing a bridging interface for the DDCED based on the universal resource identifiers.

7. The method of claim 6, wherein bridging the request comprises:

making a second determination that the request specifies one of the universal resource identifiers; and based on the second determination, forwarding the request to the guest management controller.

8. A non-transitory machine-readable medium having instructions stored therein, which when executed by a first hardware processor of a management controller of a data processing system, cause the first hardware processor to perform operations for managing diagnostic data collection enhanced devices (DDCEDs) also hosted by the data processing system, the operations comprising:

obtaining, by the management controller of the data processing system and from a requesting entity that manages operations of the data processing system and the DDCEDs, a request for diagnostic data for a DDCED of the DDCEDs, wherein the management controller is physically installed internally within the data processing system and is distinct and separate from a second processor of the data processing system, all of the DDCEDs are distinct and separate from both the management controller and the second processor and are also physically installed internally within the data processing system, and the management controller is configured as a unified interface for communications between the requesting entity and the DDCEDs such that all of the communications from the requesting entity that are meant for the DDCEDs are first received by the management controller;

making a determination, by the management controller, regarding whether the DDCED presents an interface for retrieval of the diagnostic data;

in a first instance of the determination where the DDCED presents the interface:

bridging, by the management controller, the request to a guest management controller of the DDCED, the DDCED further comprises a logic device separate from the guest management controller, the logic device manages hardware components of the DDCED for which the request for the diagnostic data is directed and comprises a second hardware processor separate from a third hardware processor of the guest management controller, the hardware components of the DDCED being separate from both the guest management controller and the logic device and comprise a fourth hardware processor separate from the second hardware processor and the third hardware processor, and the management controller of the data processing system is connected to the guest management controller using a first channel and is connected to the logic device using a second channel separate and different from the first channel;

obtaining, by the management controller, a response to the request from the guest management controller; and providing, by the management controller, the response to the requesting entity to service the request for the diagnostic data, the requesting entity being implemented as a computing device remote to the data processing system.

9. The non-transitory machine-readable medium of claim 8, wherein the operations further comprise:

in a second instance of the determination where the DDCED does not present the interface:

sending, by the management controller, a synthesized data request based on the request for the diagnostic data to the logic device of the DDCED;

obtaining, by the management controller, data that is responsive to the synthesized data request from the guest management controller;

obtaining, by the management controller, a synthetic response using the data; and providing, by the management controller, the synthetic response to the requesting entity to service the request for the diagnostic data.

10. The non-transitory machine-readable medium of claim 9, wherein the guest management controller is operably connected to the logic device, and the logic device is operably connected to the hardware components of the DDCED.

11. The non-transitory machine-readable medium of claim 10, wherein the interface is a universal resource identifier of a Representational State Transfer (REST) interface presented by the guest management controller.

12. The non-transitory machine-readable medium of claim 11, wherein the REST interface presents a portion of all available telemetry data available for the hardware components, and does not present a second portion of the all available telemetry data available for the hardware components.

13. The non-transitory machine-readable medium of claim 12, wherein the operations further comprise:

prior to obtaining the request:

identifying presence of the DDCED;

enumerating universal resource identifiers presented by the REST interface; and establishing a bridging interface for the DDCED based on the universal resource identifiers.

14. The non-transitory machine-readable medium of claim 13, wherein bridging the request comprises:

making a second determination that the request specifies one of the universal resource identifiers; and based on the second determination, forwarding the request to the guest management controller.

15. A data processing system, comprising:

a first hardware processor coupled to first memory;

diagnostic data collection enhanced devices (DDCEDs); and a management controller comprising:

a second hardware processor; and a second memory coupled to the second hardware processor to store instructions, which when executed by the second hardware processor, cause the second hardware processor to perform operations for managing the DDCEDs, the operations comprising:

obtaining, by the management controller of the data processing system and from a requesting entity that manages operations of the data processing system and the DDCEDs, a request for diagnostic data for a DDCED of the DDCEDs, wherein the management controller is physically installed internally within the data processing system and is distinct and separate from the first hardware processor of the data processing system, all of the DDCEDs are distinct and separate from both the management controller and the first hardware processor and are also physically installed internally within the data processing system, and the management controller is configured as a unified interface for communications between the requesting entity and the DDCEDs such that all of the communications from the requesting entity that are meant for the DDCEDs are first received by the management controller;

making a determination, by the management controller, regarding whether the DDCED presents an interface for retrieval of the diagnostic data;

in a first instance of the determination where the DDCED presents the interface:

bridging, by the management controller, the request to a guest management controller of the DDCED, the DDCED further comprises a logic device separate from the guest management controller, the logic device manages hardware components of the DDCED for which the request for the diagnostic data is directed and comprises a third hardware processor separate from a fourth hardware processor of the guest management controller, the hardware components of the DDCED being separate from both the guest management controller and the logic device and comprise a fifth hardware processor separate from the third hardware processor and the fourth hardware processor, and the management controller of the data processing system is connected to the guest management controller using a first channel and is connected to the logic device using a second channel separate and different from the first channel;

obtaining, by the management controller, a response to the request from the guest management controller; and providing, by the management controller, the response to a requesting entity to service the request for the diagnostic data, the requesting entity being implemented as a computing device remote to the data processing system.

16. The data processing system of claim 15, wherein the operations further comprise:

in a second instance of the determination where the DDCED does not present the interface:

sending, by the management controller, a synthesized data request based on the request for the diagnostic data to the logic device of the DDCED;

obtaining, by the management controller, data that is responsive to the synthesized data request from the guest management controller;

obtaining, by the management controller, a synthetic response using the data; and providing, by the management controller, the synthetic response to the requesting entity to service the request for the diagnostic data.

17. The data processing system of claim 16, wherein the guest management controller is operably connected to the logic device, and the logic device is operably connected to the hardware components of the DDCED.

18. The data processing system of claim 17, wherein the interface is a universal resource identifier of a Representational State Transfer (REST) interface presented by the guest management controller.

19. The method of claim 1, wherein the management controller of the data processing system is connected to and communicates with the requesting entity using an out of band management channel.

20. The method of claim 19, wherein the second hardware processor, the third hardware processor, and the fourth hardware processor are all separate from a fifth hardware processor of the management controller of the data processing system and the first hardware processor of the data processing system, the fifth hardware processor also being separate from the first hardware processor.

* * * * *